(12) United States Patent
Chhetri et al.

(10) Patent No.: US 7,813,499 B2
(45) Date of Patent: Oct. 12, 2010

(54) SYSTEM AND PROCESS FOR REGRESSION-BASED RESIDUAL ACOUSTIC ECHO SUPPRESSION

(75) Inventors: Amit Chhetri, Tempe, AZ (US); Arungunram Surendran, Sammamish, WA (US); Jack Stokes, North Bend, WA (US); John Platt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1595 days.

(21) Appl. No.: 11/097,548

(22) Filed: Mar. 31, 2005

(65) Prior Publication Data

US 2006/0222172 A1    Oct. 5, 2006

(51) Int. Cl.
*H04M 9/08* (2006.01)
(52) U.S. Cl. .............. 379/406.14; 379/406.05; 379/406.13; 381/66; 381/93; 381/94.2
(58) Field of Classification Search ..................
379/406.01–406.16
See application file for complete search history.

(56) References Cited

U.S. PATENT DOCUMENTS 6,442,274 B1 *   8/2002   Sugiyama ............... 379/406.08
2005/0063536 A1 *   3/2005   Myllyla et al. ......... 379/406.08

OTHER PUBLICATIONS

Enzner, G., R. Martin, P. Vary, Unbiased residual echo power estimation for hands-free telephony, *IEEE Int'l Conf. on Acoustics, Speech, and Signal Processing*, Orlando, Florida, May 2002, pp. 1893-1896.

Jot, J.-M., L. Cerveau, O. Warusfel, Analysis and synthesis of room reverberation based on a statistical time-frequency model, $103^{rd}$ *Convention Audio Eng'g. Soc*, New York, 1997.

Kallinger, M., J. Bitzer, Residual echo estimation with the help of minimum statistics, *Proc. $3^{rd}$ IEEE Benelux Signal Processing Symposium (SPS-2002)*, Leuven, Belgium, Mar. 21-22, 2002.

Lebart, K., J. M. Boucher, A new method based on spectral subtraction for the suppression of late reverberation from speech signals, *Audio Eng'g Soc.*, San Francisco, CA, Sep. 26-29, 1998, issue 4764.

Martin, R., Noise power spectral density estimation based on optimal smoothing and minimum statistics, *IEEE Trans. on Speech and Audio Processing*, Jul. 2001, vol. 9, No. 5, pp. 504-512.

* cited by examiner

*Primary Examiner*—Fan Tsang
*Assistant Examiner*—Ibraham Sharifzada
(74) *Attorney, Agent, or Firm*—Lyon & Harr, LLP; Richard T. Lyon

(57) ABSTRACT

A regression-based residual echo suppression (RES) system and process for suppressing the portion of the microphone signal corresponding to a playback of a speaker audio signal that was not suppressed by an acoustic echo canceller (AEC). In general, a prescribed regression technique is used between a prescribed spectral attribute of multiple past and present, fixed-length, periods (e.g., frames) of the speaker signal and the same spectral attribute of a current period (e.g., frame) of the echo residual in the output of the AEC. This automatically takes into consideration the correlation between the time periods of the speaker signal. The parameters of the regression can be easily tracked using adaptive methods. Multiple applications of RES can be used to produce better results and this system and process can be applied to stereo-RES as well.

18 Claims, 5 Drawing Sheets

SYSTEM AND PROCESS FOR REGRESSION-BASED RESIDUAL ACOUSTIC ECHO SUPPRESSION

BACKGROUND

1. Technical Field

The invention is related to residual echo suppression in a microphone signal which been previously processed by an acoustic echo canceller (AEC), and more particularly to a regression-based residual echo suppression (RES) system and process for suppressing the portion of the microphone signal corresponding to a playback of a speaker audio signal that was not suppressed by the AEC.

2. Background Art

In teleconferencing applications or speech recognition, a microphone picks up sound that is being played through the speakers. In teleconferencing this leads to perceived echoes, and in speech recognition, reduction in performance. Acoustic Echo Cancellers (AECs) are used to alleviate this problem.

However, the echo reduction provided by AEC is often not sufficient for applications that require a high level of speech quality, such as speech recognition. The insufficient echo reduction is caused by, among other things, adaptive filter lengths in AEC that are much shorter that the room response. Short AEC filters are used to make AEC computationally feasible and to achieve reasonably fast convergence. Various methods have been employed to suppress the residual echo. For example, techniques such as coring (also referred to as center clipping) were used. However, this can lead to near-end speech distortion.

Other methods to remove the residual echo tried to achieve this goal by estimating its power spectral density (PSD), and consequently removing it using Weiner filtering [1,2] or spectral subtraction [3]. However, most of those methods either need prior information about the room, or make unreasonable assumptions about signal properties. For example, some methods estimate PSD based on long-term reverberation models of the room [3]. Parameters of the model are dependent on the room configuration and need to be calculated in advance based on the behavior of the room impulse response.

There are some techniques that estimate the residual echo PSD via a so-called "coherence analysis" which is based on the cross-correlation between the speaker signal (sometimes referred to as the far-end signal in teleconferencing applications) and the residual signal. In a sub-band system, only the discrete Fourier transforms (DFTs) of the windowed signals are available, so the cross-correlations can be only approximately calculated [1]. In [2], the coherence function is computed based on a block of a few frames of data; in [1] it is based on multiple blocks. The latter assumes that the frames of the speaker signal are uncorrelated, which is almost never true. The performance of these algorithms is dictated by the accuracy of the PSD estimate and their ability to track it accurately from one frame to another. The accuracy decreases when near-end speech is present or when the echo path changes.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of references including the publications corresponding to each designator can be found at the end of the Detailed Description section.

SUMMARY

The present invention is directed toward a system and process for suppressing the residual echo in a microphone signal which been previously processed by an acoustic echo canceller (AEC), which overcomes the problems of existing techniques. In general, the present system and process uses a regression-based approach to modeling the echo residual. In other words, a parametric model of the relationship between the speaker and the echo residual after AEC is built and then these parameters are learned online. Thus, instead of estimating the power spectral density (PSD), a prescribed signal attribute (e.g., magnitude, energy, or others) of the short-term spectrum of the AEC residual signal is directly estimated in terms of the same attribute of the short-term spectra of the speaker signal using the parameterized relations. This scheme is powerful since, regression models can easily capture complex empirical relationships while providing flexibility. Tracking the parameters can be easily done using stochastic filters. Prior knowledge about room reverberation is not needed.

In one embodiment of the present system and process, the residual echo present in the output of an acoustic echo canceller (AEC) is suppressed using linear regression between the spectral magnitudes of multiple frames of the speaker signal and the spectral magnitude of the current frame of the echo residual as found in the output of an acoustic echo canceller AEC, per sub-band. The sub-bands are computed using a frequency domain transform such as the Fast Fourier Transform (FFT) or the Modulated Complex Lapped Transform (MCLT). In the tested embodiment, the MCLT is used to convert the time domain signals to the frequency domain. This model automatically takes into consideration the correlation between the frames of the speaker signal. The regression parameters are estimated and tracked using an adaptive technique.

The present regression-based echo suppression (RES) system and process is both simple and effective. Preliminary results using linear regression on magnitudes of real audio signals demonstrate an average of 8 dB of sustained echo suppression in the AEC output signal under a wide variety of real conditions with minimal artifacts and/or near-end speech distortion.

As indicated previously, in the present RES system and process, a portion of a microphone signal corresponding to a playback of a speaker audio signal sent from a remote location and played back aloud in a near-end space is suppressed. In one embodiment, this involves first processing the microphone signal using an AEC module that suppresses a first part of the speaker signal playback found in the microphone signal and generates an AEC output signal. A RES module is then employed. This module inputs the AEC output signal and the speaker signal, and suppresses at least a portion of a residual part of the speaker signal playback found in the microphone signal, which was left unsuppressed by the AEC module. The output of the RES module can be deemed the final RES output signal. However, additional suppression of the remaining portion of the speaker signal playback may be possible by employing one or more additional RES modules. In the multiple RES module embodiments, one or more additional RES modules are added, with each inputting the signal output by the preceding RES module and the speaker signal. The additional module then suppresses at least a portion of a remaining part of the speaker signal playback found in the microphone signal, which was left unsuppressed by the AEC module and all the preceding RES modules. The output of the last RES module is designated as the final RES signal.

The process used by each RES module is the same, only the input signals change. More particularly, in the case of the first (and perhaps only) RES module, the following suppression process is used for each segment of the AEC output signal, one by one, in the order in which the frame is generated. A segment can correspond to a single frame of the AEC output, as in tested embodiments of the present invention. However, in alternative embodiments, a segment can comprise multiple frames or fractions of frames, perhaps depending on external parameters, such as room size. Within each frame, a predefined range of sub-bands found within the overall frequency range are processed. First, a previously unprocessed sub-band within a prescribed overall frequency range is selected. The desired signal attribute of this band is calculated (e.g. magnitude, energy). The echo residual component associated with the selected sub-band as exhibited in the prescribed signal attribute is then predicted using a prescribed regression technique, based on a prescribed number of past periods of the speaker signal and a current set of regression coefficients. The result of this prediction is subtracted from a measure of the same signal attribute in the segment of the AEC output signal currently under consideration, to produce a difference. In addition, the noise floor of the segment of the AEC output signal currently under consideration is computed in terms of the prescribed signal attribute. It is next determined if the aforementioned difference is lower than the computed noise floor. If not, then the difference is designated as a RES output for sub-band pertaining to the segment of the AEC output signal currently under consideration, and otherwise the noise floor is designated as the RES output. The RES output signal component for the selected sub-band and the segment of the AEC output signal currently under consideration is generated from the designated RES output.

As mentioned previously, the regression coefficients can be adaptively updated as the suppression process continues. If so, it is next determined if the segment of the AEC output signal currently under consideration contains human speech components that originated in the near-end space. Whenever this is not the case, a smoothed speaker signal power is estimated for the same time period and selected sub-band. This is followed by computing a normalized gradient and updating the regression coefficients. If the regression coefficients have been updated or it was determined that the segment of the AEC output signal currently under consideration contains near-end speech components, the last computed regression coefficients are designated as the coefficients that are to be used for the associated sub-band to predict the AEC output signal echo residual component for the next segment of the AEC output signal to be considered.

The process continues by determining if there are any remaining previously unselected sub-bands. If so, another one of the sub-bands is selected and the foregoing process is repeated until there are no previously unselected sub-band-ranges remaining. At that point, the RES output signal components generated for each previously selected sub-band are combined and the combined signal components are designated as the RES output for the segment of the AEC output signal currently under consideration.

It is noted that the same process is used if the RES module in question is not the first, except that the output from the preceding RES module is used as an input in lieu of the AEC output signal.

The present RES system and process is also applicable to stereo residual suppression as well. Current stereo AEC techniques have problems with correlations between the right and left channels, however, the present RES approach can naturally handle these correlations by removing them in two passes. Thus, at least two RES modules are employed. Essentially, there is no difference in the processing itself, only a difference in which signals are input to the RES modules.

More particularly, in one embodiment of the present RES system and process applicable to stereo, a portion of a microphone signal corresponding to a playback of the right and left channels of a far-end stereo audio signal sent from a remote location, and each of which is played back aloud via separate loudspeakers in a near-end space, is suppressed. Alternatively, the stereo audio signal can be generated on the near end computer (e.g. playing music from a CD). This processing involves first processing the microphone signal using a stereo AEC module that suppresses a first part of the playback of the left and right channels of the speaker signal found in the microphone signal and generates an AEC output signal. A first RES module is then employed, which inputs the AEC output signal and one of the channels of the speaker signal. The first RES module suppresses at least a portion of a residual part of the speaker signal playback of the input channel found in the microphone signal which was left unsuppressed by the AEC module, to produce a first RES output signal. Then, a second RES module inputs the first RES output signal and the other channel of the speaker signal (i.e., the one not input by the first RES module). This second RES module suppresses at least a portion of a residual part of the speaker signal playback of the input channel found in the microphone signal which was left unsuppressed by the AEC module and the first RES module, to produce a final RES output signal. This method is also applicable to multi-channel playback where the number of playback channels is greater than 2 (e.g. 5.1, 7.1, and so on).

In an alternate embodiment of the present RES system and process applicable to stereo, the foregoing modules operate in the same way, except in this case, the first RES module inputs either the sum or difference of the two channels of the speaker signal and the second RES module inputs the sum or difference of the speaker signal-whichever one was not input by the first RES module.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 THE COMPUTING ENVIRONMENT

Figure 1:
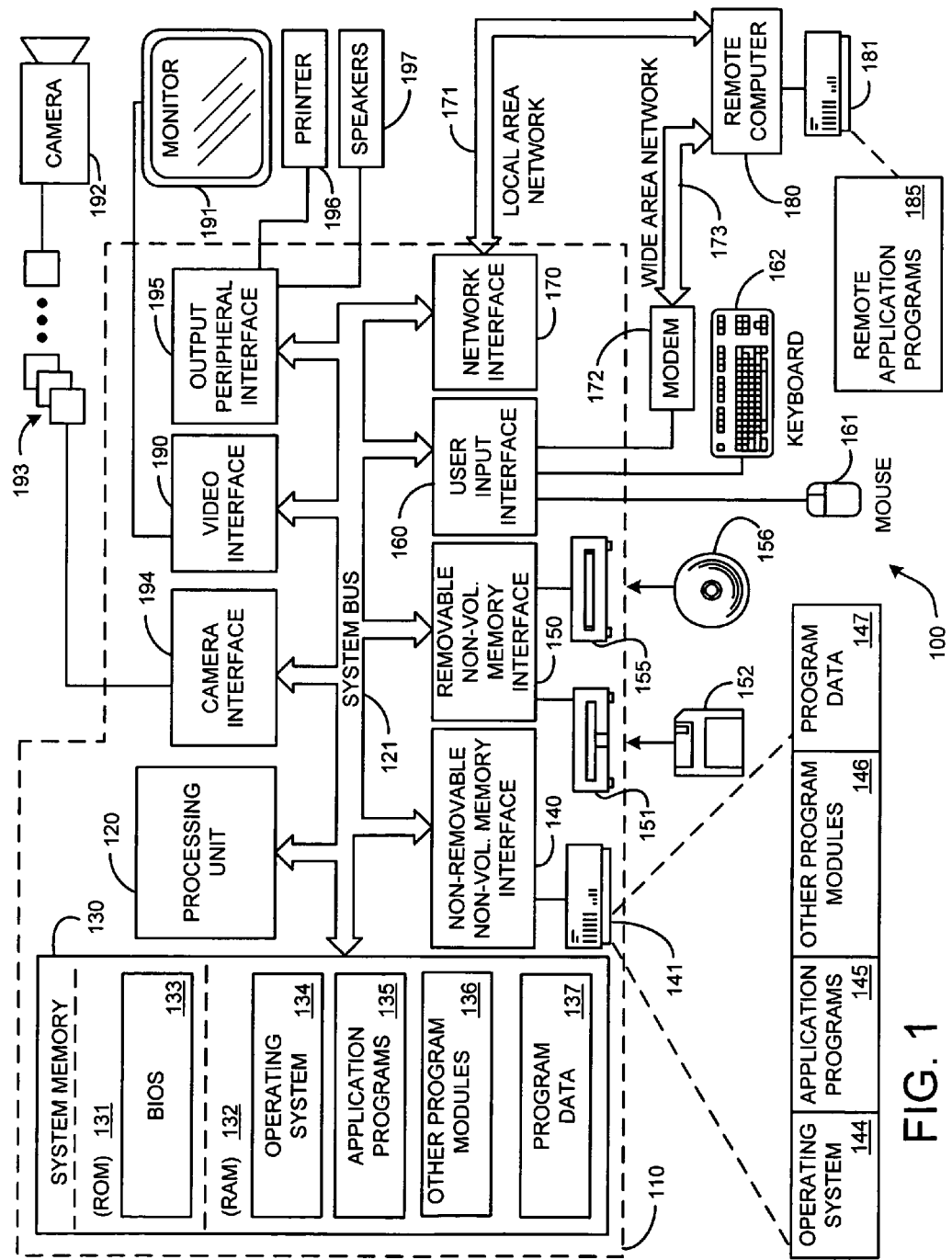
FIG. 1 is a diagram depicting a general purpose computing device constituting an exemplary system for implementing the present invention.

Before providing a description of the preferred embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 REGRESSION-BASED RESIDUAL ECHO SUPPRESSION

Figure 2:
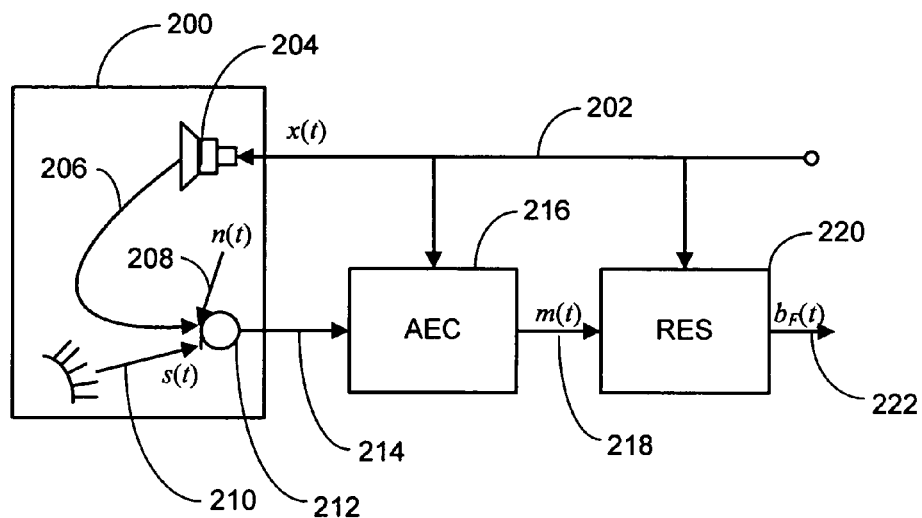
FIG. 2 is a block diagram depicting an overall echo reduction scheme including a regression-based residual echo suppression (RES) module in accordance with the present invention.

The role of the present regression-based residual echo suppression (RES) system in an overall echo reduction scheme is illustrated in FIG. 2. The speaker signal x(t) 202 coming from a remote location is received and played back in the space represented by near-end block 200 via loudspeaker 204. The far end signal playback 206, as well as the ambient noise n(t) 208 in the near-end space and near-end speech s(t) 210 is picked up by the microphone 212 which produces a microphone signal 214. This microphone signal 214 is fed into a conventional AEC module 216 which suppresses a part of the speaker signal playback picked up by the microphone. The output of the AEC module 216 is the AEC signal m(t) 218, which is in turn fed into the RES module 220. The RES module 220 uses this signal and the speaker signal 202 (which is also fed into the AEC module 216) to produce the final RES output signal b(t)$_F$ 222 in the manner that will be described next.

In RES it is desired to directly estimate the amount of residual echo energy in each frame of AEC output. This is achieved by modeling the empirical relationship between the speaker signal and the echo residual. The output of the AEC m(t) can be expressed as $$m(t)=x(t)*h_1(t)+s(t)+n(t) \qquad (1)$$

where s(t) is the near-end signal at the microphone, x(t) is the far-end or speaker signal, n(t) is the ambient noise, and $h_1(t)$ is the uncompensated part of the room impulse response. The echo residual after AEC, r(t), is $$r(t)=x(t)*h_1(t), \qquad (2)$$

where * denotes convolution. In the frequency domain, this is expressed as:

$$R(f)=X(f)H_1(f). \qquad (3)$$

This expression holds true only when infinite duration signals are considered. In reality, the signals are processed on a frame-by-frame basis (typically of 20 ms duration) and the true relationship between the short-term frames is complex. In general, the current frame of the residual signal can be expressed in terms of the current and past speaker signal frames:

$$R(f,t)=g_e(X(f,t),X(f,t-1),\ldots,X(f,t-L+1)), \qquad (4)$$

where f and t represent the frequency and time index respectively, g represents an unknown function, Θ is the set of parameters of the model, and L depicts the model order. Once a good estimate of R(f,t) is obtained, it can be subtracted from the AEC signal.

Typically, a room impulse response lasts a few hundred milliseconds. Depending on the number of taps, the AEC is able to model and cancel the effect of the relatively early echoes. The AEC residual can reasonably be assumed to be a part of the early echo and most of the late-echoes, also called long-term room response, or late reverberation. The late reverberation consists of densely packed echoes that can be modeled as white noise with an exponentially decaying envelope [4]. This, combined with the belief that the AEC captures a significant part of the phase information, leads to the belief that whatever phase information is left behind will be very difficult to track. Instead, the present system and process uses attributes of the signal (e.g., magnitude, energy) of the short-term spectrum of the echo residual expressed in terms of the same attribute of the current and previous frames of the speaker signal.

The present invention can employ any appropriate regression model (e.g., linear regression, kernel regression, decision tree regression, threshold linear models, local linear regression, and so on including non-linear models). However, it has been found that a simple linear model is quite effective, especially if the RES is applied more than once, as will be discussed later. In addition, of the aforementioned signal attributes, it has been found that magnitude is particularly effective. Thus, the following description will describe the invention in terms of a linear regression magnitude model. However, it is not intended that the present invention be limited to just this embodiment. Rather any appropriate regression model and any signal attribute could be employed instead without exceeding the scope of the invention.

Given the use of a linear regression model and magnitude as the signal attribute under consideration:

$$|R(f,t)| \approx \sum_{i=0}^{L-1} w_i |X(f,t-i)| \quad (5)$$

where $w_i$ are the regression coefficients for the magnitude model.

Adaptive RES

More particularly, the present RES system and process involves predicting the echo residual signal magnitude $\hat{R}(f,t)$ in the AEC output signal for each frequency sub-band of interest, identified by a frequency index f, and for each time period identified by a time index t (which in tested embodiments was each frame of the AEC output signal), as:

$$\hat{R}(f,t) = \sum_{i=0}^{L-1} w_i(t)|X(f,t-i)|. \quad (6)$$

In tested embodiments f ranges from 2-281 (starting at band 0) with each index number representing a 25 Hz span, t ranges from 1 to the last frame of interest output by the AEC, L is the regression order, $w_i(t)$ for i=[0 . . . L-1] are the regression coefficients for time period t, and $|X(f,t-i)|$ is the magnitude of the speaker signal for sub-band f over prior time period t-i for i=[0 . . . L-1]. The regression order L is chosen according to the room size. Since higher frequency signal components are absorbed better than lower frequency signal components [4], a relatively smaller value of L is used at higher frequencies. For example, in tested embodiments of the present RES system and process, L=10, 13 and 16 was chosen for sub-bands 2-73 (lower frequencies) and L=6, 8 and 10 for sub-bands 74-281 (higher frequencies), for small, medium, and large rooms respectively. The initial regression coefficients (i.e., $w_i(1)$) are set to zero. These coefficients are adapted thereafter as will be described shortly. Finally, it is noted that $|X(f,t)|$ is deemed to be 0 for $t \leq 0$.

Once $\hat{R}(f,t)$ is predicted for the current time period t and a particular sub-band, it can be used to remove some or all of the residual echo in the AEC signal. This removal can be accomplished in a number of ways, including spectral subtraction and Weiner filtering. The spectral subtraction method is the simplest and is described herein. First, $\hat{R}(f,t)$ is subtracted from the magnitude of the current frame of the AEC signal $|M(f,t)|$ associated with the same time period and sub-band, to produce an error signal E(f,t), as:

$$E(f,t) = |M(f,t)| - \hat{R}(f,t). \quad (7)$$

It is noted that whenever the difference between $|M(f,t)|$ and $\hat{R}(f,t)$ becomes lower than the noise floor, E(f,t) is set to the noise floor. This helps in reducing any artifacts such as musical noise in the RES output. The noise floor can be calculated using any appropriate conventional method, such as a minimum statistics noise estimation technique like the one described in [6].

The RES output signal component B(f,t) is then generated as:

$$B(f,t) = E(f,t) \exp(j\phi) \quad (8)$$

where $\phi = \angle M(f,t)$ is the current phase of the AEC output signal. This procedure is performed for the current time period t and all the remaining sub-bands, of interest, and the resulting RES output signal components B(f,t) associated with each sub-band are combined in a conventional manner to produce the RES output signal b(t). The net result is to suppress at least part of the echo residual component in the current frame of the AEC output signal.

After the initial frame of the AEC output signal is processed, the foregoing process is repeated for each new frame generated. However, the regression coefficients $w_i$ are a function of the room environment and change as the room environment changes. Thus, it is advantageous to update them on a frame-by-frame basis to ensure they more accurately reflect the current conditions. In the embodiment of the present RES system and process employing magnitude as the signal attribute of interest, a magnitude regression-based normalized least-mean squares (NLMS) adaptive algorithm is used, such as described in [5]. However, it is noted that other adaptive algorithms could be used instead, such as recursive least squares (RLS), Kalman filtering or particle filters.

More particularly, before generating the aforementioned RES output for each frame after the initial one, a decision is made as to whether to adaptively update the regression coefficients before moving on. This is done by determining if the current AEC output frame contains near end speech components, using a conventional method such as double-talk detection. If so, the regression coefficients cannot be accurately adapted and the values employed for the current frame are re-used for the next. If, however, near-end speech is absent from the current frame, then the regression coefficients are updated as follows.

First, a smoothed speaker signal power P(f,t) is estimated using a first order infinite impulse response (IIR) filter for the current frame and a particular sub-band f as:

$$P(f,t)=(1-\alpha)P(f,t-1)+\alpha\|X(f,t)\|^2 \quad (9)$$

where α is a smoothing constant which in tested embodiments was set to a small value, e.g., 0.05~0.1, and where $\|X(f,t)\|^2$ is the energy associated with the speaker signal for the same time period t (e.g., frame) and at the same sub-band. It is noted that in order to improve convergence, P(f,t) is initialized with the energy in the initial frame of the speaker signal. Thus, $P(f,0)=\|X(f,1)\|^2$. In order to prevent the smoothed estimate from attaining a zero value (and thus causing a divide by zero in further computation), a small value can be added to the P(f,t), or if P(f,t) falls below a threshold, P(f,t) can be set to that threshold. These readjustments can be considered to be part of the first-order filter.

The smoothed speaker signal power P(f,t) is used to compute a normalized gradient for the current time period and sub-band under consideration, as:

$$\nabla(t) = \frac{-2E(f,t)|X(f,t)|}{P(f,t)} \quad (10)$$

This normalized gradient is then used to update the regression coefficients employed in the current frame for the sub-band under consideration. Namely, $$w(t+1)=w(t)-\mu\nabla(t) \quad (11)$$

where w(t) is a regression coefficient vector equal to $[w_0 w_2 \ldots w_{L-1}]^T$ for the current time period (e.g., frame) at the sub-band under consideration, and μ is a small step size. The value of μ is chosen so that the residual signal estimate $\hat{R}(f,t)$ is mostly smaller than |M(f,t)|. In tested embodiments, μ was in a range of 0.0025 and 0.005. In addition, if it is determined that $\hat{R}(f,t)$ exceeds |M(f,t)|, the step size μ is multiplied by a small factor λ, e.g., 1<λ<1.5. This is to ensure the positivity of E(f,t) as much as possible.

RES Process

Figure 3A:
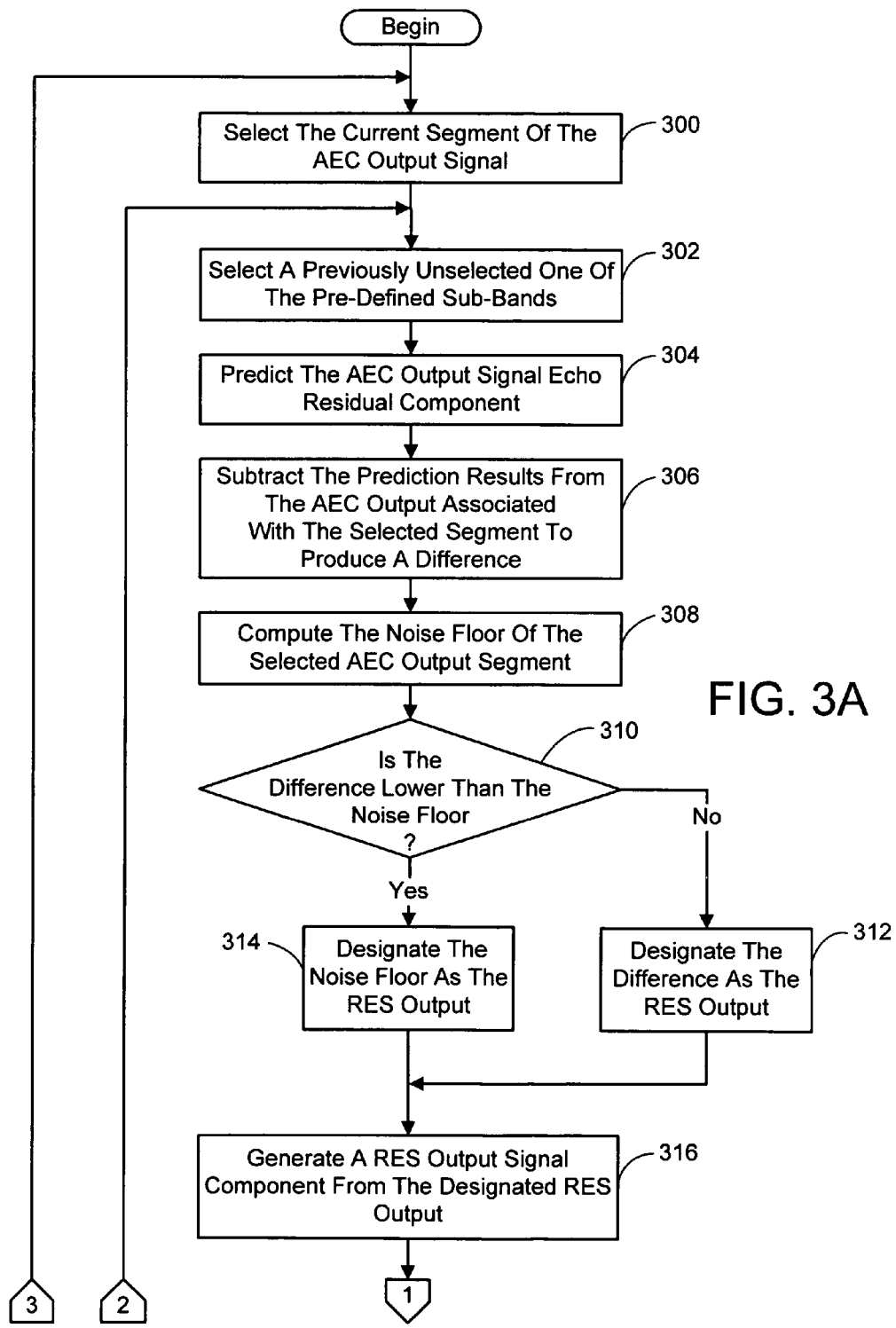
FIG. 3 shows a flow chart diagramming one embodiment of a RES process according to the present invention employed by the RES module of FIG. 2 for suppressing the portion of the microphone signal corresponding to a playback of the speaker audio signal that was not suppressed by the AEC module.
Figure 3B:
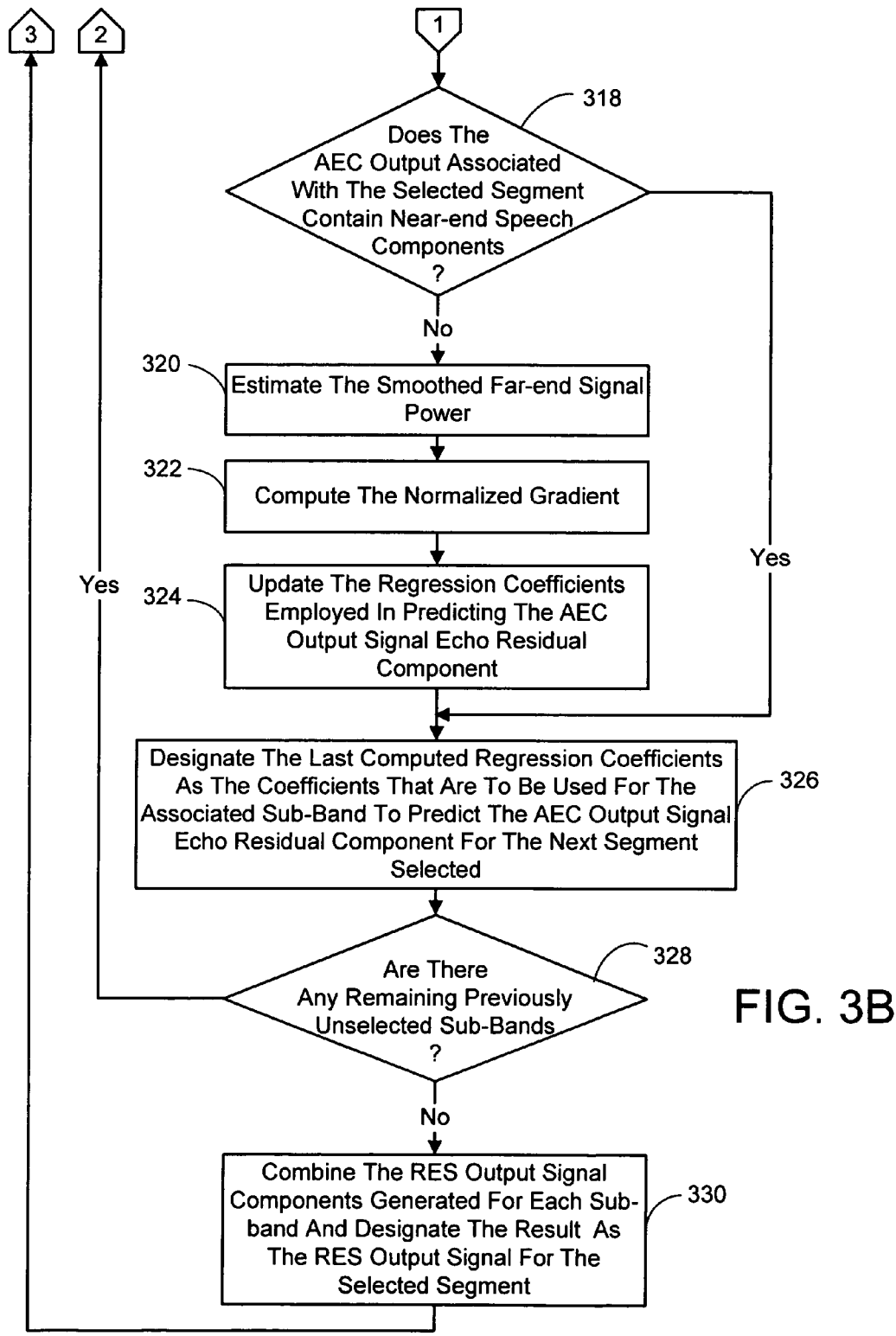

Referring to FIGS. 3A and 3B, the foregoing RES process can be summarized as follows. First, the current segment (e.g., frame) of the AEC output signal is selected (process action 300). In addition, a previously unselected one of the pre-defined sub-bands within a prescribed overall frequency range is selected (process action 302). The AEC output signal echo residual component as exhibited in a prescribed signal attribute (e.g., magnitude, energy, and so on) is then predicted in process action 304 using a prescribed regression model (e.g., linear, kernel based regression, and so on) based on a prescribed number of past periods (e.g., frames) of the speaker signal. Next, the prediction results are subtracted from the same attribute of the current AEC output period (e.g., frame) in process action 306 and the noise floor of the current AEC output period is computed in regards to the signal attribute under consideration (process action 308). It is then determined if the difference is lower than the noise floor (process action 310). If not, the difference is designated as the RES output for the currently selected time period (process action 312). However, if the difference is lower, then the noise floor is designated as the RES output for the time period (process action 314). A RES output signal component for the selected sub-band and time period is then generated from the designated RES output (process action 316).

The process continues in FIG. 3B by first determining if the AEC output associated with the currently selected time period contains near-end speech components (process action 318). If not, the smoothed speaker signal power is estimated for the selected time period and sub-band (process action 320). This is followed by computing the normalized gradient for the selected time period and sub-band (process action 322) and updating the regression coefficients employed in predicting the AEC output signal echo residual component for the selected time period and sub-band (process action 324). Once the regression coefficients are updated, or if it was determined in process action 318 that the AEC output associated with the currently selected time period contained near-end speech components, the last computed regression coefficients are designated as the coefficients that are to be used for the associated sub-band to predict the AEC output signal echo residual component for the next time period selected (process action 326).

It is next determined if there are any remaining previously unselected sub-bands (process action 328). If so, process actions 302 through 328 are repeated until there are no unselected ranges left. The RES output signal components generated for each previously selected sub-band are then combined, and the resulting signal is designated as the RES output signal for the selected period (process action 330). At that point, the entire process is repeated for the next time period by repeating process action 300 through 330 as appropriate.

Repeated Application of Adaptive RES

Figure 4:
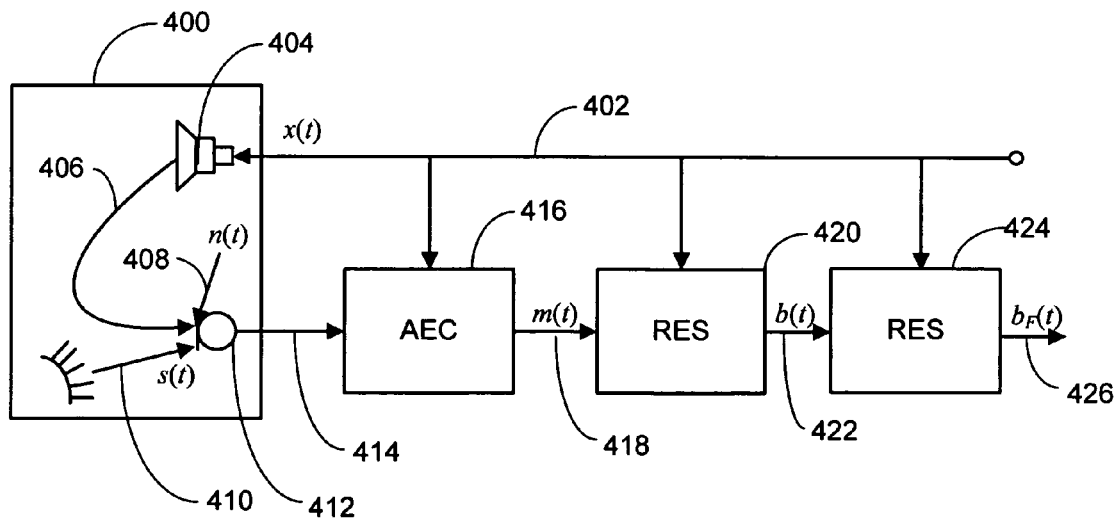
FIG. 4 is a block diagram depicting an overall echo reduction scheme including a regression-based residual echo suppression (RES) technique involving two sequential RES modules in accordance with the present invention.

Based on the cursory analysis, it can be intuitively presumed that repeated application of RES, will lead to successive reduction in echo residual. This is borne out empirically from experimentation, with a second RES application supplying an echo reduction of about 2-5 dB beyond a first RES application. Thus, when the extra processing time and costs are acceptable it is envisioned that the forgoing RES technique would be run at least twice. This modified RES technique is illustrated in FIG. 4 in an embodiment having two RES stages. As before, the speaker signal x(t) 402 is received and played back in the space represented by near-end block 400 via loudspeaker 404. The speaker signal playback 406, as well as the ambient noise n(t) 408 in the near-end space and near-end speech s(t) 410 is picked up by the microphone 412 which produces a microphone signal 414. This microphone signal 414 is fed into a conventional AEC module 416, which suppresses a part of the speaker signal playback picked up by the microphone. The output of the AEC module 416 is the aforementioned AEC signal m(t) 418, which is in turn fed into the first RES module 420. The first RES module 420 uses this signal and the speaker signal 402 (which is also fed into the AEC module 416) to produce the initial RES output signal b(t) 422 in the manner described previously. This initial RES output signal 422 is then fed into a second RES module 424 along with the speaker signal 402. The second RES module 424 repeats the present RES technique, except using the initial RES output signal b(t) 422 in lieu of the AEC output signal m(t) 418. The output of the second RES module 424 is the final RES output signal $b(t)_F$ 426. However, as indicated there could also be more than two RES stages (not shown). In that case, additional RES module(s) are added with the output of the immediately preceding RES module being fed into the next module, along with the speaker signal. The final RES output signal is then output by the last RES module in the series.

Application to Stereo AEC

Figure 5:
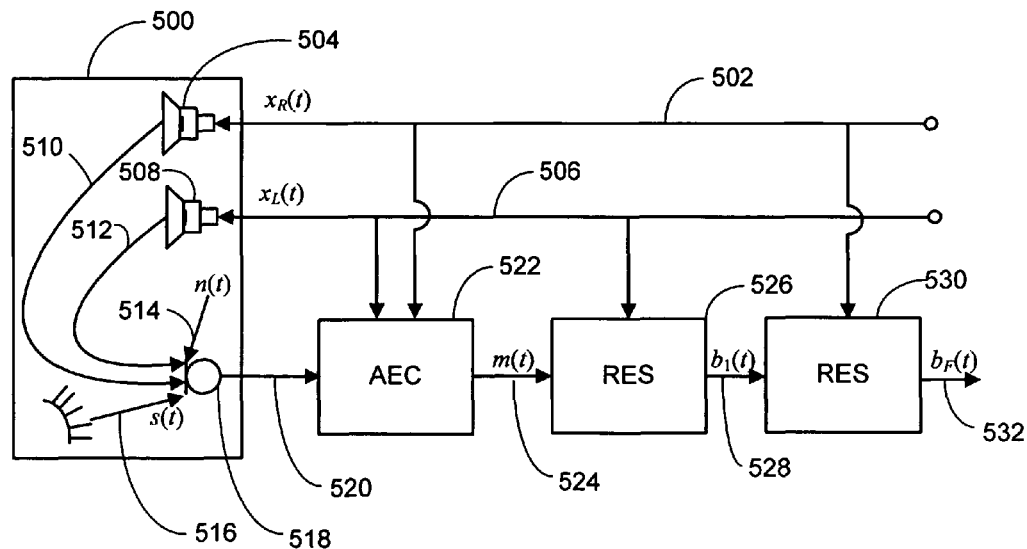
FIG. 5 is a block diagram depicting an overall echo reduction scheme for stereo playback scenarios including a regression-based residual echo suppression (RES) technique involving two sequential RES modules in accordance with the present invention, where the first RES module handles the left channel and the second RES module handles the right channel.

The present RES system and process can also be applied to stereo AEC in two ways, both involving two passes of the regression procedure, similar to the repeated application embodiment just described. Stereo AEC has problems with correlations between the right and left channels, however, the present RES approach naturally handles these correlations by removing them in two passes. Essentially, there is no difference in the processing itself, only a difference in which signals are input to the RES modules. In the first approach illustrated in FIG. 5, the present RES technique is applied to the AEC output based on the left channel speaker signal $x_L(t)$ 506 in the first pass, and then the right channel speaker signal $x_R(t)$ 502 in the second pass. More particularly, the right channel speaker signal $x_R(t)$ 502 is received and played back in the space represented by near-end block 500 via loudspeaker 504, while the left channel speaker signal $x_L(t)$ 506 is received and played back in the space via loudspeaker 508. The right and left channel far end signal playbacks 510, 512, as well as the ambient noise n(t) 514 in the near-end space and near-end speech s(t) 516 are picked up by the microphone 518, which produces a microphone signal 520. This microphone signal 520 is fed into a conventional stereo AEC module 522, along with both the right and left channel speaker signals 502, 506. The stereo AEC module 522 suppresses a part of the left and right speaker signal playback picked up by the microphone 518. The output of the AEC module 522 is the AEC signal m(t) 524, which is in turn fed into the first RES module 526. The first RES module 526 uses this signal and the left channel speaker signal $x_L(t)$ 506 to produce the first RES output signal $b_1(t)$ 528 in the manner described previously. This first RES output signal 528 is then fed into a second RES module 530 along with the right channel speaker signal 502. The second RES module 530 repeats the present RES technique, except using the first RES output signal $b_1(t)$ 528 in lieu of the AEC output signal m(t) 522. The output of the second RES module 530 is the final RES output signal $b(t)_F$ 532. This method is also applicable to multi-channel playback where the number of playback channels is greater than 2 (e.g. 5.1, 7.1, and so on).

Figure 6:
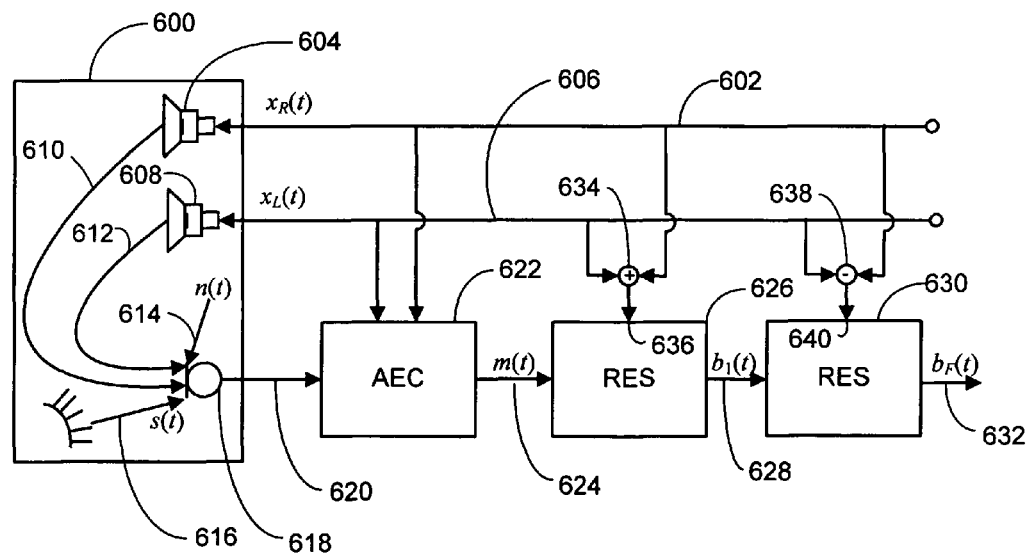
FIG. 6 is a block diagram depicting an alternate overall echo reduction scheme for stereo playback scenarios including a regression-based residual echo suppression (RES) technique involving two sequential RES modules in accordance with the present invention, where the first RES module inputs a sum of the left and right stereo channels and the second RES module inputs a difference of the left and right stereo channels.

In the second approach illustrated in FIG. 6, the present RES technique is applied to the stereo AEC output based on the sum of the left and right channel speaker signals in the first pass and on the difference between the left and right channel speaker signals in the second pass. More particularly, as in the first embodiment, the right channel speaker signal $x_R(t)$ 602 is received and played back in the space represented by near-end block 600 via loudspeaker 604, while the left channel speaker signal $x_L(t)$ 606 is received and played back in the space via loudspeaker 608. The right and left channel speaker signal playbacks 610, 612, as well as the ambient noise n(t) 614 in the near-end space and near-end speech s(t) 616 are picked up by the microphone 618 which produces a microphone signal 620. This microphone signal 620 is fed into a conventional stereo AEC module 622, along with both the right and left channel speaker signals 602, 606. The stereo AEC module 622 suppresses a part of the left and right speaker signal playback picked up by the microphone 618. The output of the AEC module 622 is the AEC signal m(t) 624, which is in turn fed into the first RES module 626. In addition, the right and left channel speaker signals 602, 606 are summed in summing module 634 and the resulting summed signal 636 is fed into the first RES module 626. The first RES module 626 uses the AEC signal m(t) 624 and the summed channel signal 636 to produce the first RES output signal $b_1(t)$ 628 in the manner described previously. This first RES output signal 628 is then fed into a second RES module 630. In addition, the right and left channel speaker signals 602, 606 are subtracted in the difference module 638 and the resulting difference signal 640 is fed into the second RES module 630. The second RES module 630 uses the first RES output signal $b_1(t)$ 628 and the difference signal 642 to produce the final RES output signal $b(t)_F$ 632 in the manner described previously.

It is noted that the order in which the left and right channel far end signals are processed in the RES modules in the first stereo RES embodiment or the order in which the summed and difference signals are processes in the RES modules in the second stereo RES embodiment could be reversed from that described above if desired.

3.0 REFERENCES

[1] G. Enzner, R. Martin and P. Vary, "Unbiased residual echo power estimation for hands free telephony", ICASSP '02, pp. 1893-1896, Orlando, Fla., May 2002.

[2] M. Kallinger and K. Kammeyer, "Residual echo estimation with the help of minimum statistics", IEEE Benelux Signal Processing Symposium, Leuven, Belgium, March 2002.

[3] K. Lebart, et. al., "A New Method Based on Spectral Subtraction for the Suppression of Late Reverberation from Speech Signals", Audio Engineering Society Issue 4764, 1998.

[4] J-M. Jot, et. al., "Analysis and Synthesis of Room Reverberation Based on a Statistical Time-Frequency Model", Audio Eng. Soc. 103rd Convention, New York, 1997.

[5] S. Haykin, "Adaptive Filter Theory", Prentice Hall, 4th Edition, September 2001.

[6] R. Martin, "Spectral subtraction based on minimum statistics," Proc. EUSIPCO-94, pp. 1182-1185, Edinburgh, 1994.

Wherefore, what is claimed is:

1. A system for suppressing a portion of a microphone signal corresponding to a speaker audio signal played aloud in a space having a microphone therein which picks-up a speaker signal playback and generates a microphone signal, said system comprising:

a general purpose computing device; and a computer program comprising program modules executable by the computing device, said modules comprising, an acoustic echo canceller (AEC) module which suppresses some parts of the speaker signal playback found in the microphone signal and generates an AEC output signal, and a regression-based residual echo suppression (RES) module which accepts the AEC output signal and the speaker signal, and suppresses at least a portion of a residual part of the speaker signal playback found in the microphone signal left unsuppressed by the AEC module to produce a RES output signal, wherein the RES module comprises sub-modules which, for each segment of the AEC output signal in the order it is generated:

(a) select a previously unselected one of a sequence of pre-defined sub-bands found within a prescribed overall frequency range;

(b) predict an echo residual component associated with the selected sub-band in the AEC output signal as exhibited in a prescribed signal attribute using a prescribed regression technique and based on a prescribed number of past segments of the far end signal;

(c) use the results of said prediction from a measure of the same signal attribute in the segment of the AEC output signal currently under consideration to remove residual echo from the RES output;

(d) determine if there are any remaining previously unselected sub-bands;

(e) whenever it is determined there are remaining previously unselected sub-bands, repeat the execution of sub-modules (a) through (d) until there are no previously unselected sub-band-ranges remaining;
(f) combine the RES output signal components generated for each previously selected sub-band; and
(g) designate the combined RES output signal components as the RES output for the segment of the AEC output signal currently under consideration.

2. The system of claim 1, wherein the prescribed signal attribute is magnitude and the prescribed regression technique is linear regression, and wherein the sub-module for predicting the AEC output signal echo residual component associated with the selected sub-band comprises a sub-module for computing a linear combination of a plurality of magnitudes of the speaker signal for the selected sub-band, each of the plurality of magnitudes computed on a segment of the AEC output signal.

3. The system of claim 2, wherein the segment of the AEC output signal corresponds to a frame of the AEC output signal.

4. The system of claim 2, wherein the plurality of magnitude comprises 10, 13 and 16 magnitudes for small, medium and large-sized rooms respectively whenever the upper end of the selected sub-band frequency is less than about 1800 Hz, and comprises 6, 8 and 10 magnitudes for small, medium and large-sized rooms respectively whenever the lower end of the selected sub-band frequency is more than about 1800 Hz.

5. The system of claim 1, wherein the sub-module for using the results of said prediction from a measure of the same signal attribute in the segment of the AEC output signal currently under consideration to remove residual echo from the RES output, comprises sub-modules for:
   subtracting the results of said prediction from a measure of the same signal attribute in the segment of the AEC output signal currently under consideration to obtain a difference;
   computing a noise floor of the segment of the AEC output signal currently under consideration in terms of said signal attribute;
   determining if said difference is lower than the computed noise floor;
   whenever the difference is determined not to be lower than the computed noise floor, designating the difference as a RES output for the segment of the AEC output signal currently under consideration;
   whenever the difference is determined to be lower than the computed noise floor, designating the noise floor as a RES output for the segment of the AEC output signal currently under consideration; and
   generating the RES output signal component for the selected sub-band and the segment of the AEC output signal currently under consideration from the designated RES output.

6. The system of claim 5, wherein the sub-module for generating the RES output signal component for the selected sub-band and the segment of the AEC output signal currently under consideration from the designated RES output, comprises a sub-module for computing the RES output signal component from the difference between the magnitude of the AEC output signal and the predicted magnitude of the AEC output signal echo residual component for the selected sub-band over the segment of the AEC output signal under consideration, and the phase of the AEC output signal for the selected sub-band and segment under consideration.

7. A system for suppressing a portion of a microphone signal corresponding to a speaker audio signal played aloud in a space having a microphone therein which picks-up a speaker signal playback and generates a microphone signal, said system comprising:
   a general purpose computing device; and
   a computer program comprising program modules executable by the computing device, said modules comprising,
      an acoustic echo canceller (AEC) module which suppresses some parts of the speaker signal playback found in the microphone signal and generates an AEC output signal, and
      a regression-based residual echo suppression (RES) module which accepts the AEC output signal and the speaker signal, and suppresses at least a portion of a residual part of the speaker signal playback found in the microphone signal left unsuppressed by the AEC module to produce a RES output signal, wherein the RES module comprises sub-modules which, for each segment of the AEC output signal in the order it is generated:
      (a) select a previously unselected one of a sequence of pre-defined sub-bands found within a prescribed overall frequency range;
      (b) predict an AEC output signal echo residual component associated with the selected sub-band as exhibited in a prescribed signal attribute using a prescribed regression technique, based on a prescribed number of past segments of the far end signal and a current set of regression coefficients;
      (c) subtract the results of said prediction from a measure of the same signal attribute in the segment of the AEC output signal currently under consideration to obtain a difference;
      (d) compute a noise floor of the segment of the AEC output signal currently under consideration in terms of said signal attribute;
      (e) determine if said difference is lower than the computed noise floor;
      (f) whenever the difference is determined not to be lower than the computed noise floor, designate the difference as a RES output for the segment of the AEC output signal currently under consideration;
      (g) whenever the difference is determined to be lower than the computed noise floor, designate the noise floor as a RES output for the segment of the AEC output signal currently under consideration;
      (h) generate the RES output signal component for the selected sub-band and the segment of the AEC output signal currently under consideration from the designated RES output;
      (i) determine if the segment of the AEC output signal currently under consideration contains speech components originating in said space;
      (j) whenever the segment of the AEC output signal currently under consideration does not contain near-end speech components, estimate a smoothed speaker signal power for the same time period and selected sub-band;
      (k) compute a normalized gradient for said time period and the selected sub-band;
      (l) update the regression coefficients employed in predicting the AEC output signal echo residual component for said time period and selected sub-band;
      (m) whenever the regression coefficients have been updated or it was determined that the segment of the AEC output signal currently under consideration contains near-end speech components, designate the last computed regression coefficients as the coefficients that are to be used for the associated sub-band to predict the AEC output signal echo residual component for the next segment of the AEC output signal to be considered;

(n) determine if there are any remaining previously unselected sub-bands;

(o) whenever it is determined there are remaining previously unselected sub-bands, repeat the execution of sub-modules (a) through (n) until there are no previously unselected sub-band-ranges remaining;

(p) combine the RES output signal components generated for each previously selected sub-band; and (q) designate the combined RES output signal components as the RES output for the segment of the AEC output signal currently under consideration.

8. The system of claim 7, wherein the prescribed signal attribute is magnitude, and wherein the sub-module for estimating the smoothed speaker signal power comprises a sub-module for computing a first-order filter of the energy associated with the speaker signal for the segment at the selected sub-band, said first-order filter comprising a smoothing constant $\alpha$.

9. The system of claim 8, wherein the smoothing constant $\alpha$ is set in a range of about 0.05 to about 0.10.

10. The system of claim 8, wherein the sub-module for computing a normalized gradient accepts as input the difference between the magnitude of the AEC output signal and a predicted magnitude of the AEC output signal echo residual component for the selected sub-band over the segment of the AEC output signal under consideration, a magnitude of the speaker signal for the selected sub-band over the segment of the AEC output signal under consideration, and the smoothed speaker signal power for the selected sub-band.

11. The system of claim 10, wherein the sub-module for updating the regression coefficients comprises a sub-module for multiplying the normalized gradient by a step size, and a sub-module for subtracting the multiplied normalized gradient from the current regression coefficient vector.

12. The system of claim 11, wherein the step size is chosen to be in a range of about 0.0025 to about 0.005.

13. The system of claim 12, wherein whenever the predicted magnitude of the AEC output signal echo residual component exceeds the magnitude of the AEC output signal, for the selected sub-band over the segment of the AEC output signal under consideration, the step size is multiplied by a factor, wherein the factor is a value greater than 1.0.

14. A system for suppressing a portion of a microphone signal corresponding to a speaker audio signal played aloud in a space having a microphone therein which picks-up a speaker signal playback and generates a microphone signal, said system comprising:

a general purpose computing device; and a computer program comprising program modules executable by the computing device, said modules comprising, an acoustic echo canceller (AEC) module which suppresses some parts of the speaker signal playback found in the microphone signal and generates an AEC output signal, a regression-based residual echo suppression (RES) module which accepts the AEC output signal and the speaker signal, and suppresses at least a portion of a residual part of the speaker signal playback found in the microphone signal left unsuppressed by the AEC module to produce a RES output signal, and one or more additional RES modules each of which inputs the signal output by a preceding RES module and the speaker signal, and suppresses at least a portion of a residual part of the speaker signal playback found in the microphone signal which was left unsuppressed by the AEC module and all the preceding RES modules, to produce a RES output signal, and wherein the last signal output by a last RES module is designated as the final RES signal.

15. The process of claim 1, wherein the prescribed signal attribute is one of (i) magnitude or (ii) energy.

16. The process of 1, wherein the prescribed regression technique is one of (i) linear regression, (ii) kernel regression, (iii) decision tree regression, (iv) threshold linear models, or (v) local linear regression.

17. The process of claim 7, wherein the prescribed signal attribute is one of (i) magnitude or (ii) energy.

18. The process of claim 7, wherein the prescribed regression technique is one of (i) linear regression, (ii) kernel regression, (iii) decision tree regression, (iv) threshold linear models, or (v) local linear regression.

* * * * *